United States Patent
De Vries

(10) Patent No.: US 12,530,130 B2
(45) Date of Patent: Jan. 20, 2026

(54) PREEMPTIVE WRITE SUSPENSION IN MEMORY SYSTEMS

(71) Applicant: SK Hynix NAND Product Solutions Corp., Rancho Cordova, CA (US)

(72) Inventor: Jonathan De Vries, Folsom, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 18/391,209

(22) Filed: Dec. 20, 2023

(65) Prior Publication Data

US 2025/0208765 A1     Jun. 26, 2025

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0659; G06F 3/0679
See application file for complete search history.

(56) References Cited

U.S. PATENT DOCUMENTS

| | | | |
|---|---|---|---|
| 2016/0041786 A1 | 2/2016 | Erez | |
| 2016/0162186 A1* | 6/2016 | Kashyap | G06F 3/0688 711/103 |
| 2019/0065075 A1* | 2/2019 | Nagarajan | G06F 3/0659 |
| 2019/0065086 A1* | 2/2019 | Margetts | G06F 13/1668 |
| 2019/0243577 A1* | 8/2019 | Pelster | G06F 3/0659 |
| 2019/0278515 A1* | 9/2019 | Wells | G06F 3/064 |
| 2020/0273523 A1* | 8/2020 | Donati | G11C 11/5642 |
| 2021/0200481 A1* | 7/2021 | Buxton | G06F 9/4418 |
| 2021/0405928 A1 | 12/2021 | Bert | |
| 2022/0058141 A1* | 2/2022 | Magro | G06F 13/1684 |
| 2022/0342703 A1* | 10/2022 | Hong | G06F 3/0679 |
| 2023/0004321 A1 | 1/2023 | Jo | |
| 2023/0065300 A1 | 3/2023 | Labat et al. | |
| 2023/0214147 A1* | 7/2023 | Chodem | G06F 3/0679 711/164 |

(Continued)

FOREIGN PATENT DOCUMENTS

JP     2007072696 A     3/2007

OTHER PUBLICATIONS

SK Hynix NAND Product Solutions Corp. (dba Solidigm), PCT/US2024/060852, International Search Report and Written Opinion, Apr. 16, 2025, 8 pgs.

*Primary Examiner* — Edward J Dudek, Jr.
(74) *Attorney, Agent, or Firm* — Morgan, Lewis & Bockius LLP

(57) ABSTRACT

This application is directed to managing memory operations in a memory system or device (e.g., a solid-state drive (SSD)). While implementing one or more write operations on one or more active memory dies, the memory device identifies a first read request for data stored on a first memory die. The first read request is waiting next in a queue of read requests. In accordance with a determination (1) that the first memory die is distinct from the one or more active memory dies and (2) that no sufficient power is available to implement the first read request concurrently with the one or more write operations, the memory device suspends the one or more write operations according to a suspension scheme and implements the first read operation on the first memory die.

20 Claims, 8 Drawing Sheets

(56) References Cited

U.S. PATENT DOCUMENTS

| | | | | |
|---|---|---|---|---|
| 2023/0350584 A1* | 11/2023 | Desai | ................... | G06F 3/0659 |
| 2023/0393742 A1* | 12/2023 | Karr | ....................... | G06F 3/064 |
| 2024/0311052 A1* | 9/2024 | Nakazumi | ............ | G06F 3/0679 |
| 2024/0345734 A1* | 10/2024 | Hiwada | ................ | G06F 3/0611 |

* cited by examiner

PREEMPTIVE WRITE SUSPENSION IN MEMORY SYSTEMS

TECHNICAL FIELD

This application relates generally to memory management including, but not limited to, methods, systems, and non-transitory computer-readable storage media for managing memory operations in a memory system.

BACKGROUND

Memory is applied in a computer system to store instructions and data. The computer system includes non-volatile memory that acts as secondary memory to keep data stored thereon if the computer system is decoupled from a power source. Examples of the secondary memory include, but are not limited to, hard disk drives (HDDs) and solid-state drives (SSDs). A memory system implements steady-state drive operations within power limitations, and must compromise read performance under a workload consisting of extended write operations and sporadic read operations. Read operations are often stalled due to a power shortage caused by simultaneous write operations, resulting in a relatively long wait time for read operations compared to their associated reading time. A write operation only relinquishes power consumption for a read operation that targets the same memory units accessed by the write operation. This impacts read throughput and creates extended read latency tails, thereby affecting the overall read quality of service (QOS). It would be beneficial to develop a solution that manages write and read operations to guarantee the overall read quality for a memory system.

SUMMARY

Various embodiments of this application are directed to methods, systems, devices, non-transitory computer-readable storage media for managing memory operations (e.g., read and write operations) in a memory system (e.g., including one or more solid state drives (SSDs)). Write operations are preemptively suspended with an interval by a controller, and associated power used for the write operations is relinquished to an overall power budget. In accordance with a determination that a read operation is waiting in a queue for power allocation, the read operation is implemented during the interval and using the power that is relinquished by the a write operation, independently of whether the same memory unit or distinct memory units are accessed by the read operation and the write operation. The read operation does not need to wait until the write operation to complete to get started. In some situations, the read operation is completed promptly, thereby allowing the write operation to resume without being delayed significantly. By these means, the memory system can control latency times of both of the write and read operations efficiently, while keeping steady-state drive operations.

Some implementations of this application are used to increase read throughput and quality of service (QOS) in a memory device (e.g., an SSD), particularly when system power is constrained and when write operations last for extended durations of time. Power consumption for data transfer over a memory channel (which is required by the write or read operations) is larger than that for operations on memory cells where data are stored. In some situations, a write operation on a physical location of the memory device is suspended to relinquish its power to enable a read operation on the same physical location. In some situations, the write operation on the physical location of the memory device is suspended to relinquish its power to enable a read operation on a distinct physical location of the memory device. Additionally, in some embodiments, while the write operation on the physical location is suspended, both of the read operations on the same or distinct physical locations are implemented in parallel or successively, thereby reducing latency times for both read operations.

In one aspect, a method is implemented at a memory device (e.g., a solid-state drive (SSD)) for managing memory operations (e.g., read and write operations) in a memory system. The method includes while implementing one or more write operations on one or more active memory dies of the memory system, identifying a first read request for data stored on a first memory die. The first read request is waiting next in a queue of read requests. The method further includes, in accordance with a determination (1) that the first memory die is distinct from the one or more active memory dies and (2) that no sufficient power is available to implement the first read request concurrently with the one or more write operations, suspending the one or more write operations according to a suspension scheme and implementing the first read operation on the first memory die.

In some embodiments, suspending the one or more write operations according to the suspension scheme further includes, in accordance with the suspension scheme, initiating a first suspension timer on a first write operation on a first active memory die, stopping the first suspension timer of the first write operation, and in accordance with a determination that sufficient power is available to continue the first write operation, restarting the first write operation.

Some implementations of this application include an electronic device or a memory system. The electronic device or the memory system includes a controller, a memory device coupled to the controller and including local control circuitry, and memory having instructions stored thereon, which when executed by the memory device cause the memory device to perform any of the above methods.

Some implementations of this application include a memory device that includes control circuitry and memory having instructions stored thereon, which when executed by the control circuitry cause the control circuitry to perform any of the above methods.

Some implementations include a non-transitory computer readable storage medium storing one or more programs. The one or more programs include instructions, which when executed by a memory device cause the memory device to implement any of the above methods.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices using secondary storage.

Various embodiments of this application are directed to methods, systems, devices, non-transitory computer-readable storage media for managing memory operations (e.g., read and write operations) in a memory system (e.g., including one or more solid state drives (SSDs)). Write operations are preemptively suspended with an interval by a controller, and associated power used for the write operations is relinquished to an overall power budget. In accordance with a determination that a read operation is waiting in a queue for power allocation, the read operation is implemented during the interval and using the power that is relinquished by the a write operation, independently of whether the same memory unit or distinct memory units are accessed by the read operation and the write operation. The read operation does not need to wait until the write operation to complete to get started. In some situations, the read operation is completed promptly, thereby allowing the write operation to resume without being delayed significantly. By these means, the memory system can control latency times of both of the write and read operations efficiently, while enhancing read throughput and quality of service in the memory system.

Figure 1:
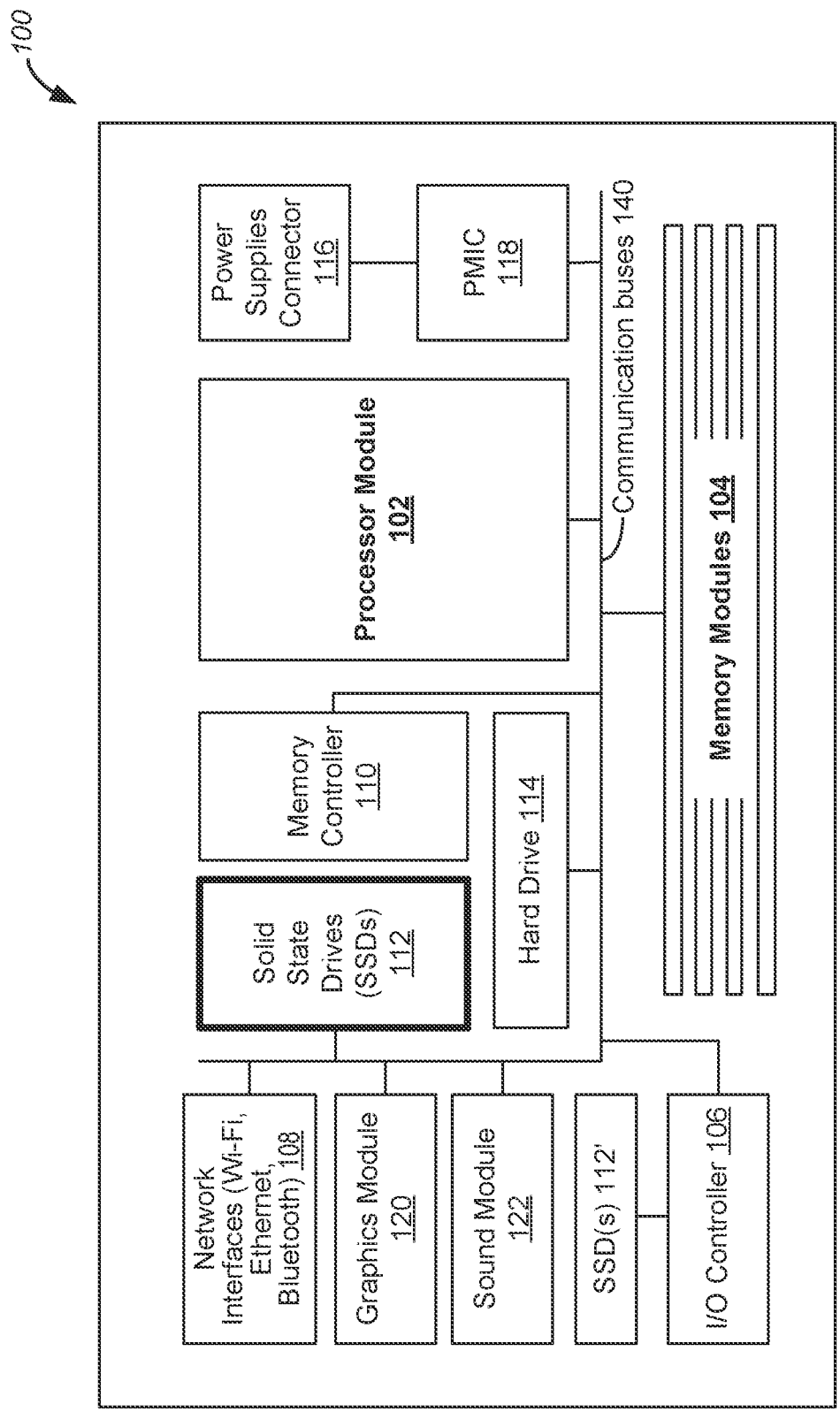
FIG. 1 is a block diagram of an example system module in a typical electronic device in accordance with some embodiments.

FIG. 1 is a block diagram of an example system module 100 in a typical electronic system in accordance with some embodiments. The system module 100 in this electronic system includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a trackpad) via a universal serial bus interface. In some embodiments, the network interfaces 108 includes one or more interfaces for Wi-Fi, Ethernet and Bluetooth networks, each allowing the electronic system to exchange data with an external source, e.g., a server or another electronic system. In some embodiments, the communication buses 140 include circuitry (sometimes called a chipset) that interconnects and controls communications among various system components included in system module 100.

In some embodiments, the memory modules 104 include high-speed random-access memory, such as static random-access memory (SRAM), double data rate (DDR) dynamic random-access memory (DRAM), or other random-access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, SSD(s) 112, an HDD 114, power management integrated circuit (PMIC) 118, a graphics module 120, and a sound module 122. The memory controller 110 is configured to control communication between the processor module 102 and memory components, including the memory modules 104, in the electronic system. The SSD(s) 112 are configured to apply integrated circuit assemblies to store data in the electronic system, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic system. The graphics module 120 is configured to generate a feed of output images to one or more display devices according to their desirable image/video formats. The sound module 122 is configured to facilitate the input and output of audio signals to and from the electronic system under control of computer programs.

Alternatively or additionally, in some embodiments, the system module 100 further includes SSD(s) 112' coupled to the I/O controller 106 directly. Conversely, the SSDs 112 are coupled to the communication buses 140. In an example, the communication buses 140 operates in compliance with Peripheral Component Interconnect Express (PCIe or PCI-E), which is a serial expansion bus standard for interconnecting the processor module 102 to, and controlling, one or more peripheral devices and various system components including components 110-122.

Further, one skilled in the art knows that other non-transitory computer readable storage media can be used, as new data storage technologies are developed for storing information in the non-transitory computer readable storage media in the memory modules 104, SSD(s) 112 or 112', and HDD 114. These new non-transitory computer readable storage media include, but are not limited to, those manufactured from biological materials, nanowires, carbon nanotubes and individual molecules, even though the respective data storage technologies are currently under development and yet to be commercialized.

Figure 2:
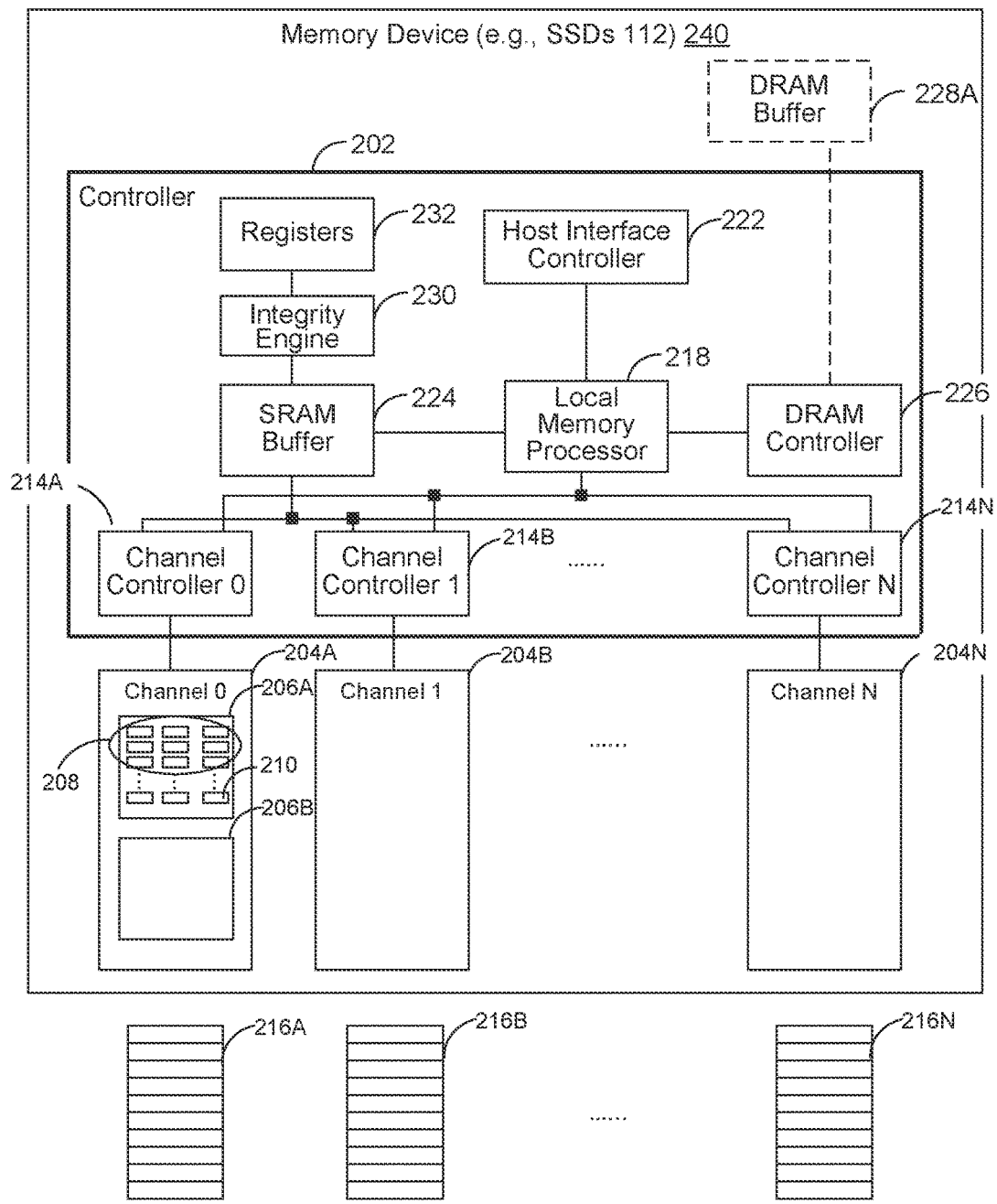
FIG. 2 is a block diagram of a memory system of an example electronic device having one or more memory access queues, in accordance with some embodiments.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system and execute user applications. The memory system 200 includes one or more memory devices 240 (e.g., SSD(s)). Each memory device 240 further includes a controller 202 and a plurality of memory channels 204 (e.g., channel 204A, 204B, and 204N). Each memory channel 204 includes a plurality of memory cells. The controller 202 is configured to execute firmware level software to bridge the plurality of memory channels 204 to the host device 220. In some embodiments, each memory device 240 is formed on a printed circuit board (PCB).

Each memory channel 204 includes on one or more memory packages 206 (e.g., two memory dies). In an example, each memory package 206 (e.g., memory package 206A or 206B) corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory device 240 includes a plurality of superblocks. Each superblock includes a plurality of memory blocks each of which further includes a plurality of memory pages 210. For each superblock, the plurality of memory blocks are configured to be written into and read from the memory system via a memory input/output (I/O) interface concurrently. Optionally, each superblock groups memory cells that are distributed on a plurality of memory planes 208, a plurality of memory channels 204, and a plurality of memory dies 206. In an example, each superblock includes at least one set of memory pages, where each page is distributed on a distinct one of the plurality of memory dies 206, has the same die, plane, block, and page designations, and is accessed via a distinct channel of the distinct memory die 206. In another example, each superblock includes at least one set of memory blocks, where each memory block is distributed on a distinct one of the plurality of memory dies 206 includes a plurality of pages, has the same die, plane, and block designations, and is accessed via a distinct channel of the distinct memory die 206. The memory device 240 stores information of an ordered list of superblocks in a cache of the memory device 240. In some embodiments, the cache is managed by a host driver of the host device 220, and called a host managed cache (HMC).

In some embodiments, the memory device 240 includes a single-level cell (SLC) NAND flash memory chip, and each memory cell stores a single data bit. In some embodiments, the memory device 240 includes a multi-level cell (MLC) NAND flash memory chip, and each memory cell of the MLC NAND flash memory chip stores 2 data bits. In an example, each memory cell of a triple-level cell (TLC) NAND flash memory chip stores 3 data bits. In another example, each memory cell of a quad-level cell (QLC) NAND flash memory chip stores 4 data bits. In yet another example, each memory cell of a penta-level cell (PLC) NAND flash memory chip stores 5 data bits. In some embodiments, each memory cell can store any suitable number of data bits. Compared with the non-SLC NAND flash memory chips (e.g., MLC SSD, TLC SSD, QLC SSD, PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 (e.g., controller 214A, 214B, or 214N) configured to control internal and external requests to access memory cells in the respective memory channel 204. In some embodiments, each memory package 206 (e.g., each memory die) corresponds to a respective queue 216 (e.g., queue 216A, 216B, or 216N) of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory device 240 corresponds to a single queue 216 of memory access requests. Each memory access request is optionally received internally from the memory device 240 to manage the respective memory channel 204 or externally from the host device 220 to write or read data stored in the respective channel 204. Specifically, each memory access request includes one of: a system write request that is received from the memory device 240 to write to the respective memory channel 204, a system read request that is received from the memory device 240 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a memory controller to implement internal memory management functions including, but are not limited to, garbage collection, wear levelling, read disturb mitigation, memory snapshot capturing, memory mirroring, caching, and memory sparing.

In some embodiments, in addition to the channel controllers 214 (e.g., controller 214A, 214B, or 214N), the controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and reads from the plurality of memory channels 204 on a memory block basis. Data of one or more memory blocks are written into, or read from, the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the controller 202. Alternatively, in some embodiments, the local memory processor 218 stores data to be written into, or read from, each memory block in the plurality of memory channels 204 in a DRAM buffer 228A that is included in memory device 240, e.g., by way of the DRAM controller 226. Alternatively, in some embodiments, the local memory processor 218 stores data to be written into, or read from, each memory block in the plurality of memory channels 204 in a DRAM buffer 228B that is main memory used by the processor module 102 (FIG. 1). The local memory processor 218 of the controller 202 accesses the DRAM buffer 228B via the host interface controller 222.

Figure 3:
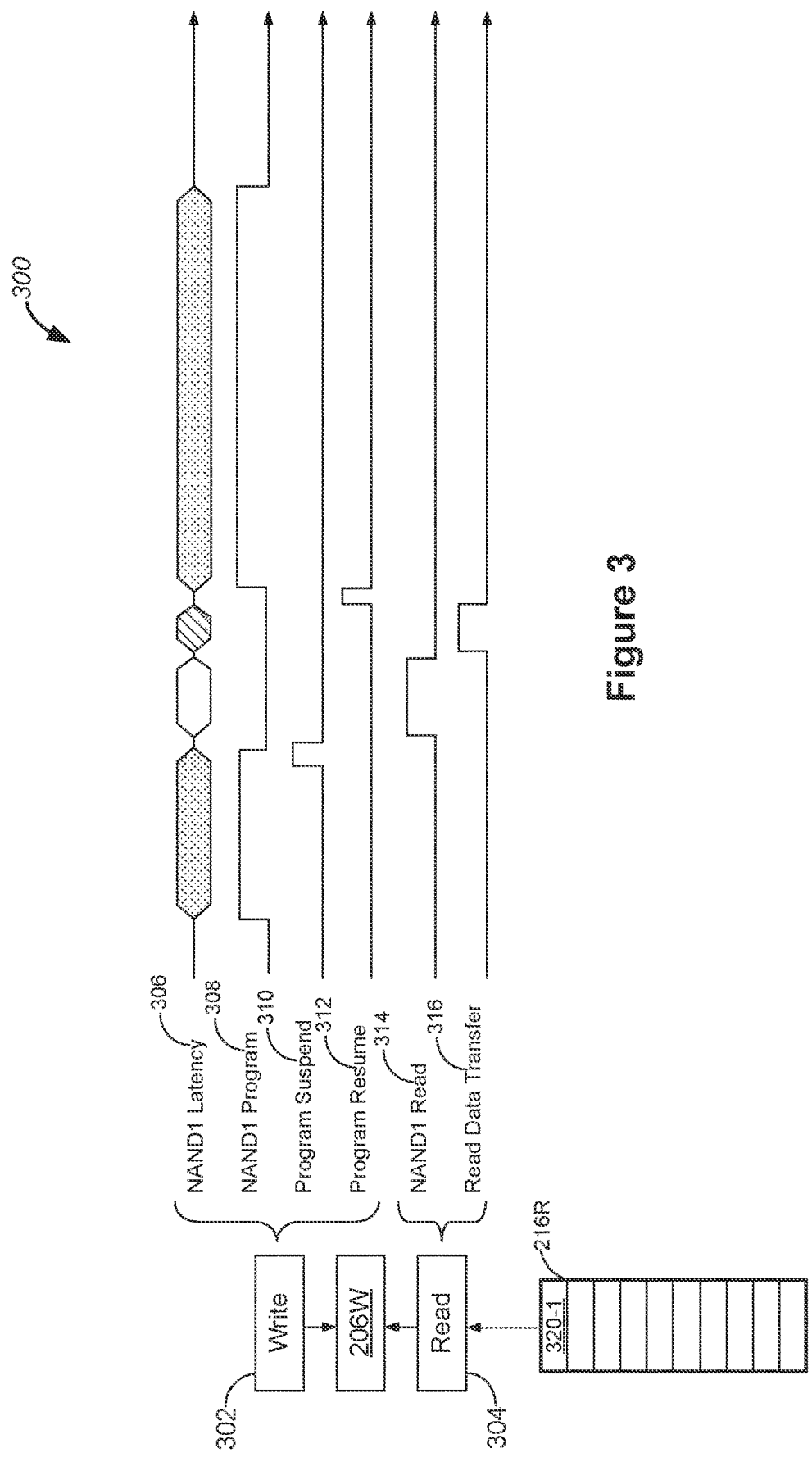
FIG. 3 is a temporal diagram of a set of memory operation signals associated with an active write operation and a first read operation, in accordance with some embodiments.

In some embodiments, data in the plurality of memory channels 204 is grouped into coding blocks, and each coding block is called a codeword (e.g., 302 in FIG. 3). For example, each codeword includes n bits among which k bits correspond to user data and (n-k) corresponds to integrity data of the user data, where k and n are positive integers. In some embodiments, the memory device 240 includes an integrity engine 230 (e.g., an LDPC engine) and registers 232, which include a plurality of registers or SRAM cells or flip-flops and are coupled to the integrity engine 230. The integrity engine 230 is coupled to the memory channels 204 via the channel controllers 214 and SRAM buffer 224. Specifically, in some embodiments, the integrity engine 230 has data path connections to the SRAM buffer 224, which is further connected to the channel controllers 214 via data paths that are controlled by the local memory processor 218. The integrity engine 230 is configured to verify data integrity and correct bit errors for each coding block of the memory channels 204.

Some implementations of this application are directed to managing memory operations (e.g., read and write operations) in a memory channel 204 of a memory device 240. While implementing one or more write operations on one or more active memory dies, the memory devices identifies a first read request for data stored on a first memory die. The first read request is waiting next in a queue of read requests. In accordance with a determination (1) that the first memory die is distinct from the one or more active memory dies and (2) that no sufficient power is available to implement the first read request concurrently with the one or more write operations, the memory system suspends the one or more write operations according to a suspension scheme and implements the first read operation on the first memory die. In some embodiments, in accordance with the suspension scheme, a memory controller initiates a first suspension timer on a first write operation on a first active memory die, and stops the first suspension timer of the first write operation. The first operation is restarted in accordance with a determination that sufficient power is available to continue the first write operation.

FIG. 3 is a temporal diagram of a set of memory operation signals 300 associated with an active write operation 302 and a first read operation 304, in accordance with some embodiments. Both the active write operation 302 and the first read operation 304 are implemented on the same memory die of a memory device 240. For illustration purposes only, this memory die is denoted as 206W. The operation signals 300 include a latency signal 306, a program signal 308, a program suspension signal 310, a program resume signal 312, a read signal 314, and a data transfer signal 316. The signals 306-310 are applied to control the active write operation 302, and the signals 314 and 316 are applied to control the first read operation 304. The active write operation 302 is initiated on the memory die 206W after the program signal 308 is enabled. While implementing the active write operation 302, the memory device 240 identifies a first read request 320-1 for a first read operation 304 on data stored on the memory die 206W in a queue of read requests 216R. The memory device 240 suspends the active write operation 302 using the program suspension signal 310, and implements the first read operation 304 to read the data stored on the memory die 206W in response to the first read request 320-1. Specifically, a physical address of the data is identified in response to the read signal 314, and the data stored at the physical address of the memory die 206W is transferred to a temporary storage of a memory controller 202 in response to the data transfer signal 316. After the first read operation 304 is implemented, the program resume signal 312 is enabled to control the latency signal 306 and the program signal 308 and restart the active write operation 302 that has been suspended.

Figure 4:
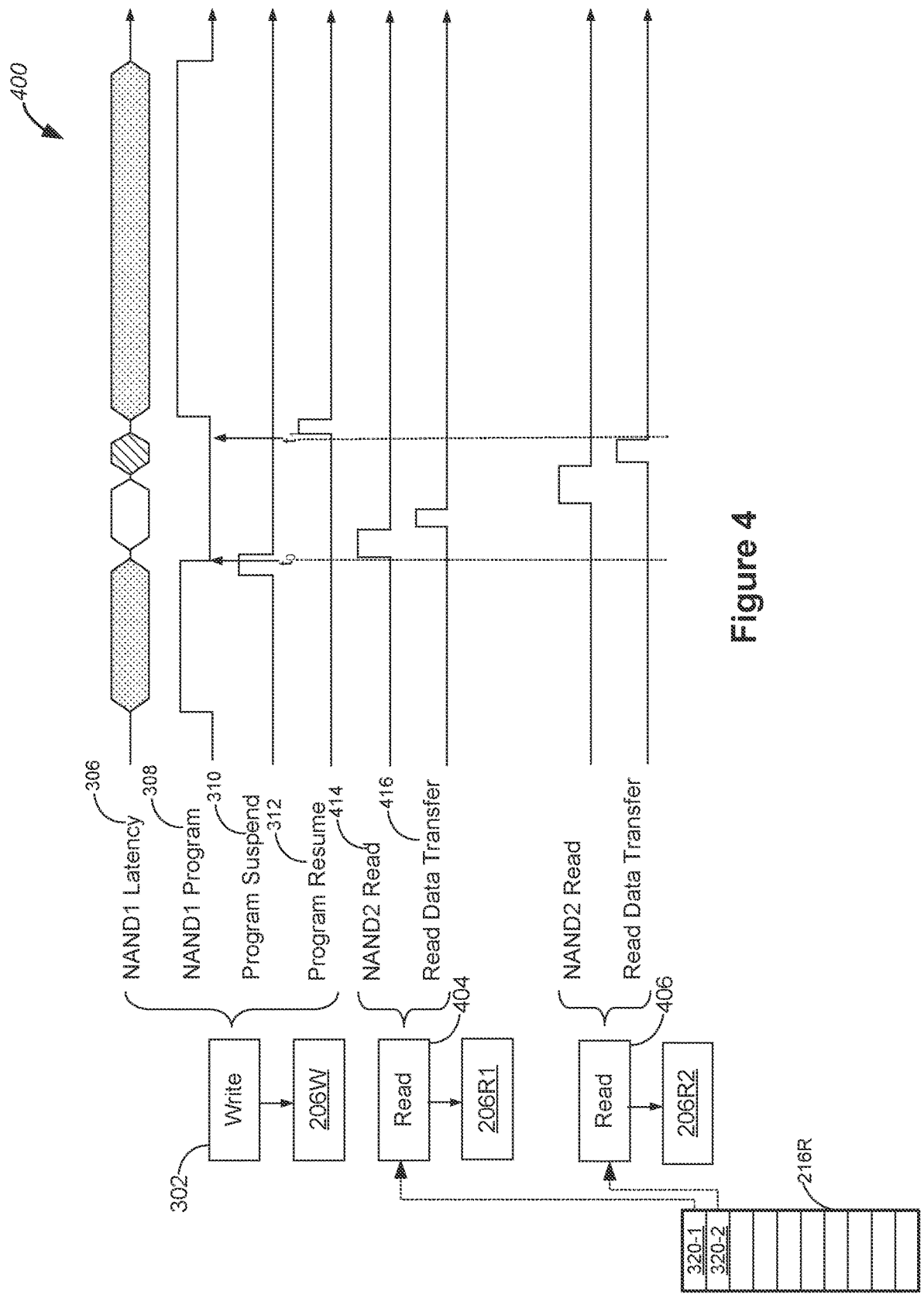
FIG. 4 is a temporal diagram of another set of memory operation signals associated with an active write operation and one or more read operations, in accordance with some embodiments.

FIG. 4 is a temporal diagram of another set of memory operation signals 300 associated with an active write operation 302 and one or more read operations (e.g., 404 and 406), in accordance with some embodiments. In these embodiments, the active write operation 302 and each of the read operations 404 and 406 are implemented on different memory dies 206 of a memory device 240, and the active write operation 302 is suspended to reserve power for implementing the read operations 404 and 406. Assume that the active write operation 302 is implemented on an active memory die 206W of the memory device 240. Each read operation 404 or 406 is implemented on a respective memory die 206R1 or 206R2 distinct from the active memory die 206. While the memory device 240 is implementing the active write operation 302 on the active memory die 206W, it identifies a first read request 320-1 for a first read operation 404 on data stored on a first memory die 206R1. The first read request 320-1 is waiting next in a queue of read requests 216R. In some embodiments, the memory device 240 determines that the first memory die 206R1 is distinct from the active memory die 206W, and that no sufficient power is available to implement the first read operation 404 concurrently with the active write operation 302. In accordance with a determination that the first memory die 206R1 is distinct from the active memory die 206W and that no sufficient power is available to implement the first read operation 404 concurrently with the active write operation 302, the memory device 240 suspends the active write operation 302 according to a suspension scheme and implements a first read operation 404 on the first memory die 206R1 in response to the first read request 320-1.

In some embodiments, the operation signals 400 include a latency signal 306, a program signal 308, a program suspension signal 310, a program resume signal 312, a read signal 414, and a data transfer signal 416. The signals 306-310 are applied to control the active write operation 302, and the signals 414 and 416 are applied to control the first read operation 404. The active write operation 302 is initiated on the memory die 206 after the program signal 308 is enabled. While implementing the active write operation 302, the memory device 240 identifies the first read operation 404 for data stored on the memory die 206 in a queue of read requests 216R. The memory device 240 suspends the active write operation 302 under the control of the program suspension signal 310. In response to the program suspension signal 310, the memory device 240 implements the first read operation 404 to read associated data stored on the memory die 206. Specifically, in some embodiments, a physical address of the data is identified when the read signal 414 is enabled, and the data stored at the physical address of the memory die 206 is transferred to a temporary storage of a memory controller 202 when the data transfer signal 316 is enabled. After the first read operation 404 is implemented, the program resume signal 312 is enabled to control the latency signal 306 and the program signal 308 and restart the active write operation 302 that has been suspended.

In some embodiments, during the course of suspending the active write operation 302 according to the suspension scheme, in accordance with the suspension scheme, the memory device 240 initiates a first suspension timer on the active write operation 302 on the active memory die 206W, e.g., at a time to and in response to a rising edge of the program suspension signal 310, and stops the first suspension timer of the active write operation 302, e.g., at a time $t_1$. In accordance with a determination that sufficient power is available to continue the active write operation 302, the memory device restarts the active write operation 302. In some embodiments, an interval timed by the first suspension timer has a predefined duration of time $T_0$ (e.g., equal to $t_1-t_0$). In some embodiments, the program suspension signal 310 is enabled after the interval timed by the first suspension timer and in accordance with a determination that sufficient power is available to continue the active write operation 302. Further, in some embodiments, available power of the memory device 240 is monitored constantly, and the program suspension signal 310 is enabled to restart a suspended program controlling the active write operation 302 as soon as available power is sufficient to continue the active write operation 302.

While the active write operation 302 is suspended, the first suspension timer of the active write operation 302 is running (e.g., between to and $t_1$), and the memory device 240 starts, implements, and completes the first read operation 404 (e.g., between to and $t_1$).

In some embodiments, a second read request 320-2 follows, and is waiting next after, the first read request 320-1 in the queue of read requests 216R. While or after implementing the first read operation 404, the memory device 240 identifies the second read request 320-2 for a second read operation 406 on data stored in a second memory die 206R2. In accordance with a determination that the second memory die 206R2 is distinct from the active memory die 206W and that the suspended active write operation 302 has not been resumed (e.g., between to and $t_1$), the memory device continues to suspend the active write operation 302 and implements the second read operation 406 on the second memory die 206R2. In some embodiments, the second memory die 206R2 is identical to the first memory die 206R1. Alternatively, in some embodiments, the second memory die 206R2 is distinct from the first memory die 206R1.

In some embodiments, the memory device 240 includes an NAND component. A write program associated with a write operation 302 is suspended to allow for a read operation 404 on the same NAND component. A program suspension signal 310 and a program resume signal 312 have non negligible delay times with respect to a latency signal 316 associated with the write operation 302. The NAND component is configured to support write, read, and erase operations on different granularities. An NAND command can perform a single memory operation to a specified address at a given time. In order to perform a different operation, the NAND component must be idle, complete or abort its previous operation. Particularly, in some embodiments, the program suspension signal 310 issues a pulse to disable the program signal 308 temporarily. In the event, the NAND component is occupied by the write operation 302, it is advantageous to abort that write operation 302 in favor of a higher priority command (e.g., a host read request 320-1 that is deemed as having a higher priority than the ongoing write operation 302). The NAND component supports a program suspend, effectively aborting the write program associated with the write operation 302 for the duration of the read command (e.g., the host read request 320-1).

In some embodiments, the read request 320-1 is detected to target the NAND component that is currently occupied by the active write operation 302. An arbitrator either in software or hardware issues a program suspend command or signal 310. A write program associated with a write operation 302 is temporarily aborted, freeing up the NAND component for the read operation 404. Once the read operation 404 has completed, the arbiter may send a resume signal or command 312 for the write operation 302 to resume.

Memory operations (e.g., Read, Write or Erase) executed on the NAND components draw power. A power governor (PWG) is implemented in hardware or software to manage a finite shared power among all components in a memory system 200. The PWG acts as an arbiter for power distribution and tally power usage over all components. For example, a read command wins arbitration for power before a corresponding read operation 404 is implemented. The PWG is polled for the necessary power quanta, and once granted, the read operation 404 may proceed. In accordance with a determination that the read command does not win the power arbitration, the read operation 404 is stalled until power is available, e.g., when one or more current write operations are completed. Power consumption is different for memory operations, such as read, program, erase. In some embodiments, a channel operation includes a data transfer to a memory controller 202 for write or a data transfer from a memory controller 202 to the host 220 for read. Compared with the channel operation, an read operation 404 from a memory die 206 consumes less power than the data transfer for read.

In some embodiments, the memory device 240 has a power limit (e.g., 10 W) that does not allow the write operations 302 and the read operation 404 to be implemented concurrently. When the write operations 302 include multiple operations and hit the power limit, the read operation 404 cannot get started, even though the read operation 404 only consumes 100 mW. In some situations, the read operation 404 waits until at least one of the write operations 302 is completed to release its power. Alternatively, in some situations, the read operation 404 is implemented using the power temporarily released by the write operations 302. This allows the read operation 404 to be completed promptly without being waiting in the queue for an extended duration of time.

Figure 5:
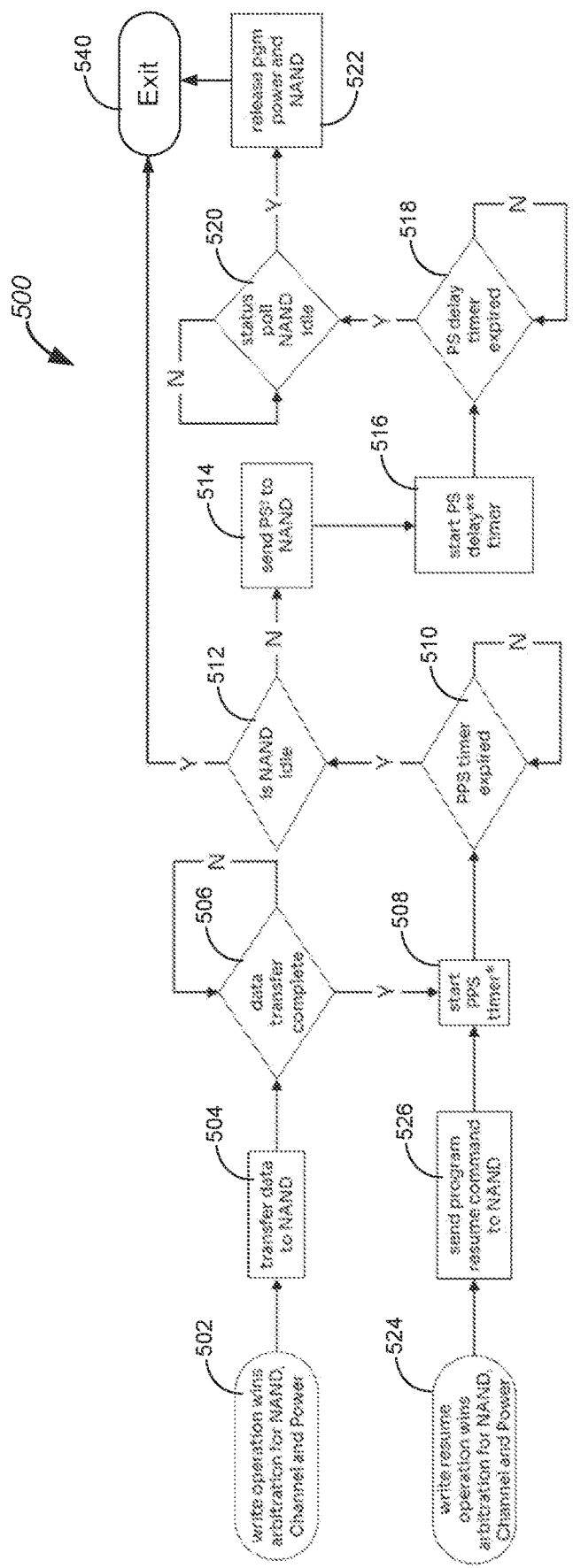
FIG. 5 is a flow diagram of an example process of controlling memory operations based on a suspension timer, in accordance with some embodiments.

FIG. 5 is a flow diagram of an example process 500 of controlling memory operations (e.g., write and read operations) based on a suspension timer, in accordance with some embodiments. An active write operation 302 of a program wins (operation 502) arbitration and uses allocated resources to get started. During the active write operation 302, a corresponding memory device 240 transfers (operation 504) data from a temporary memory (e.g., SRAM buffer 224 in FIG. 2) to a designated memory unit identified by a logical address associated with the active write operation 302. While the data transfer continues for the active write operation 302, the memory device 240 monitors (operation 506) whether the data transfer is completes. The memory device 240 suspends the active write operation 302 to implement a first read operation 404 associated with a first read request 320-1 waiting in a queue of read requests 216R. Specifically, in some embodiments of this application, a preemptive program suspension (PPS) timer is applied to control suspension of the active write operation 302. The PPS timer is started (operation 508), and runs until a predefined interval expires (operation 510). In some embodiments, the PPS timer includes a parameter (e.g., a length of the interval) that is set statically and/or tuned dynamically for optimal performance. For example, referring to FIG. 4, the interval lasts from a time to of issuing a command in response to enabling a program suspend signal 310 to a time $t_1$ of completing writing suspension. In some situations, one or more read operations (e.g., 404 and 406 in FIG. 4) are implemented during the interval of the PPS timer.

In some embodiments, after the suspension timer expires, the memory device 240 determines (operation 512) whether its memory channels 204 are idle (e.g., whether all memory operations in associated queues of requests 206 are completed). In accordance with a determination that the memory channels 204 are idle, the memory device 240 exits (operation 540) the program including the active write operation 302. Conversely, in accordance with a determination that the memory channels 204 are not idle (e.g., that the memory device 240 have sufficient power to continue the active write operation 302), the memory device 240 enables (operation 514) a corresponding program suspension signal 310 (FIG. 3), and starts (operation 516) a program suspension (PS) delay timer to measure a latency of the memory device 240 it takes from latching of a suspend command until the program is finally suspended. This PS delay timer is generally used to reduce status polling needed to determine if the memory device is suspended. The memory device 240 determines (operation 518) whether the PS delay timer expires. In accordance with a determination that the PS delay timer expires, the memory device 240 polls (operation 520) its own status (including status of its associated channels 204). In accordance with a determination that the memory channels 204 are idle, the memory device 240 releases (operation 522) power and I/O bandwidths for accessing its memory channels 204, and optionally exits (operation 540) the program including the active write operation 302.

In some embodiments, after the active write operation 302 is suspended and the suspension timer expires, the memory device 240 determines whether there is sufficient power to restart the suspended active write operation 302. The memory device 240 determines (operation 524) that the active write operation 302 wins arbitration for power and I/O bandwidth (i.e., that there is sufficient power and I/O bandwidth). The memory device 240 sends (operation 526) the program for continuing the suspended active write operation 302.

Figure 6:
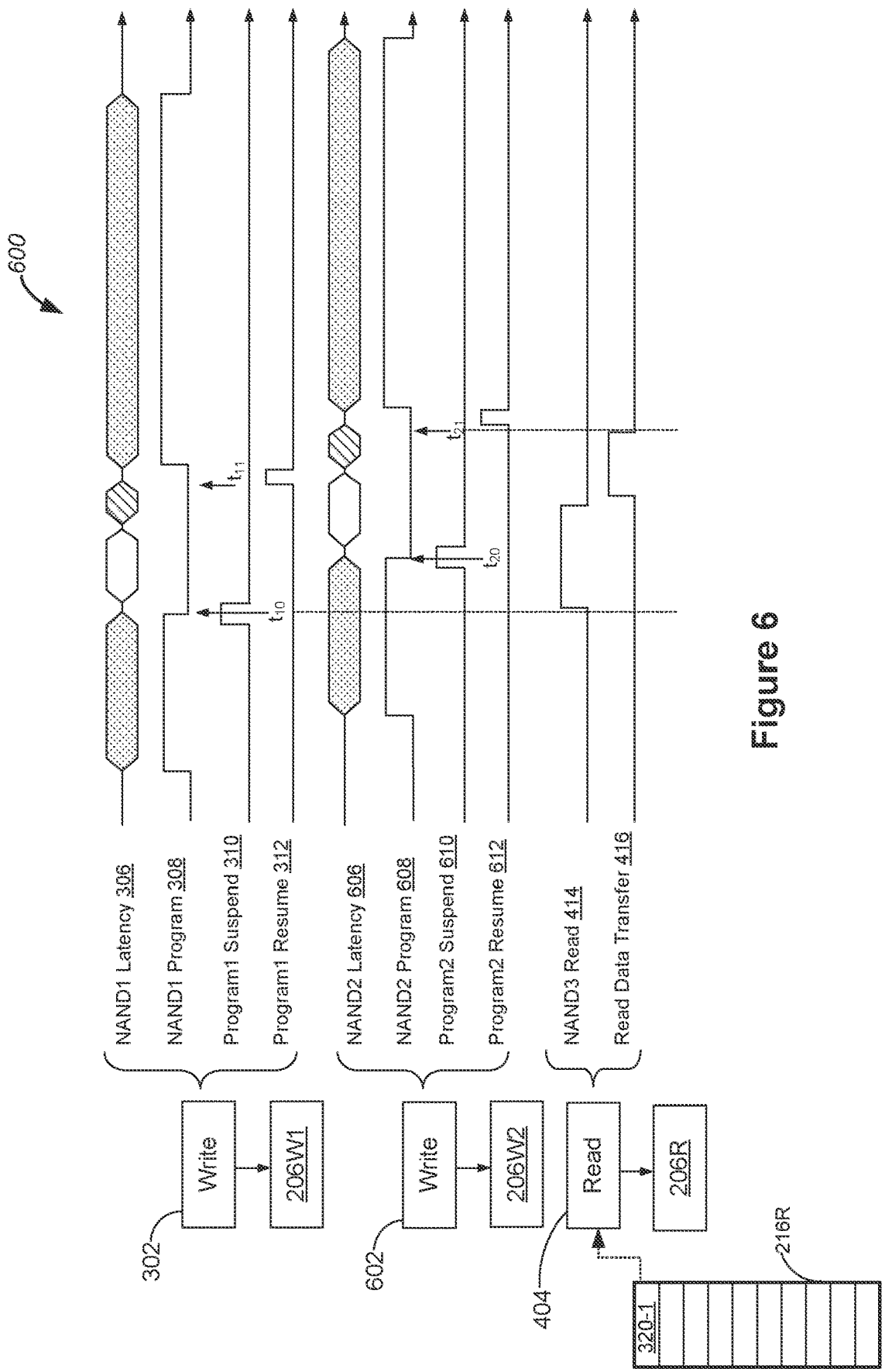
FIG. 6 is a temporal diagram of a set of memory operation signals associated with two active write operations and a read operation, in accordance with some embodiments.

FIG. 6 is a temporal diagram of a set of memory operation signals 600 associated with two active write operations 302 and 602 and a read operation 404, in accordance with some embodiments. The two write operations 302 and 602 are implemented on two active memory dies 206W1 and 206W2, respectively, and the read operation 404 is implemented on a memory die 206R of a memory device 240. While the memory device 240 is implementing a first write operation 302 on the active memory die 206W1, it identifies the read request 320-1 for the read operation 404 on data stored on a memory die 206R. The read request 320-1 is waiting next in a queue of read requests 216R. In some embodiments, the memory device 240 determines that the memory die 206R is distinct from the active memory die 206W1, and that no sufficient power is available to implement the read operation 404 concurrently with the first write operation 302. In accordance with a determination that the memory die 206R1 is distinct from the active memory die 206W1 and that no sufficient power is available to implement the read operation 404 concurrently with the first write operation 302, the memory device 240 suspends the first write operation 302 according to a suspension scheme and implements the read operation 404 on the memory die 206R1 in response to the read request 320-1.

In some embodiments, the operation signals 400 include a latency signal 306, a program signal 308, a program suspension signal 310, and a program resume signal 312, a read signal 414, and a data transfer signal 416. The signals 306-310 are applied to control the first write operation 302, and the signals 414 and 416 are applied to control the first read operation 404. The active write operation 302 is initiated on the memory die 206 after the program signal 308 is enabled. While implementing the active write operation 302, the memory device 240 identifies the first read operation 404 for data stored on the memory die 206 in a queue of read requests 216R. The memory device 240 suspends the active write operation 302 under the control of the program suspension signal 310. In response to the program suspension signal 310, the memory device 240 implements the first read operation 404 to read associated data stored on the memory die 206.

In some embodiments, a second write operation 602 is implemented at least partially concurrently with the first write operation 302. The second write operation 602 is optionally initiated earlier or later than the first write operation 302, and the second write operation 602 is optionally completed earlier or later than the first write operation 302. In this example (FIG. 6), the second write operation 602 is configured to start and end earlier than the first write operation 302 if neither of the operations 302 and 602 is suspended. In some embodiments, the first and second write operations 302 and 602 are sequentially according to a predefined order. Referring FIG. 6, in some embodiments, while the first write operation 302 is suspended, the second write operation 602 follows and is also suspended. While the second write operation 602 is suspended, the memory device 240 determines that there is sufficient power to resume the first write operation 302, and the first write operation 302 is restarted. Stated another way, while the first suspension timer is running (e.g., between times $t_{10}$ and $t_{11}$), the memory device 240 initiates a second suspension timer (e.g., at a time $t_{20}$) on the second write operation 602 on a second distinct active memory die 206W2. While the second suspension timer is running (e.g., between times $t_{20}$ and $t_{21}$), the memory device 240 stops the first suspension timer (e.g., at a time $t_{11}$) on the first write operation 302, restarts the first write operation 302, and continues to implement and complete the first read operation 302 (e.g., after a time $t_{11}$). Further, in some embodiments, the memory device 240 stops the second suspension timer of the second write operation 602 at a time $t_{21}$ and restarts the second write operation 602.

Specifically, in some embodiments, while the first suspension timer associated with the first write operation 302 is running, the memory device 240 initiates the second suspension timer on the second write operation 602 on the second distinct active memory die 206W2. The first read operation is completed, e.g., between times $t_{10}$ and $t_{21}$. At each instant, the first write operation 302, the second write operation 602, or both of them are suspended to provide power to implement the read operation 404. In accordance with a determination that sufficient power is available to continue the second write operation 602 and that the second suspension timer has expired, the memory device 240 receives a write resume instruction to restart the second write operation 602.

In some embodiments, the operation signals 400 further include a latency signal 606, a program signal 608, a program suspension signal 610, and a program resume signal 612. The signals 606-610 are applied to control the second write operation 302. The second write operation 602 is initiated on the memory die 206W2 after the program signal 608 is enabled. The memory device 240 suspends the active write operation 302 under the control of the program suspension signal 610. The memory device 240 continues the first read operation 404 to read associated data stored on the memory die 206. After the first read operation 404 is implemented, the program resume signal 612 is enabled to control the latency signal 606 and the program signal 608 and restart the second write operation 302 that has been suspended.

In some embodiments, each of the first and second write operations 302 and 602 is restarted in accordance with a determination that sufficient power is available to restart the respective write operation. In other words, each write operation 302 or 602 is suspended by initiating a respective suspension timer. In accordance with a determination that sufficient power is available and that a suspension timer associated with each write operation 302 or 602 has expired, the memory device 240 obtains a write resume instruction (e.g., the program resume signal 312 or 612) to continue the respective write operation and restarts the respective suspended write operation 302 or 602.

Figure 7:
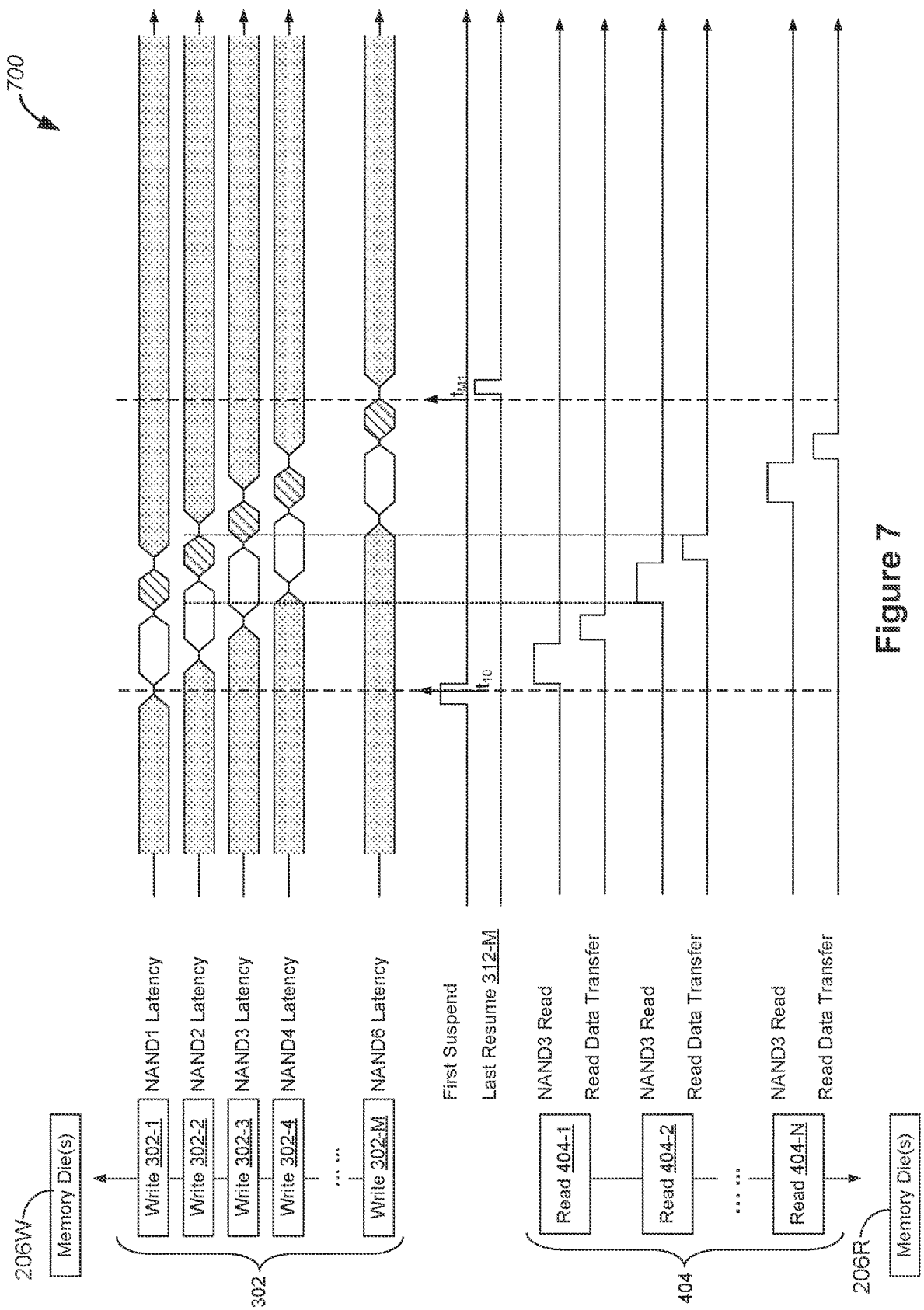
FIG. 7 is a temporal diagram of a set of memory operation signals associated with a plurality of active write operations and a plurality of read operations, in accordance with some embodiments.

FIG. 7 is a temporal diagram of a set of memory operation signals 700 associated with a plurality of active write operations 302 (e.g., 302-1 to 302-M) and a plurality of read operations 404 (404-1 to 404-N), in accordance with some embodiments. Each of the write operations 302 is implemented on a respective active memory die 206W, and each of the read operations 404 is implemented on a respective memory die 206R of a memory device 240. While implementing the plurality of active write operations 302 on the active memory dies 206W, the memory device 240 successively identifies a plurality of read requests, which are waiting in a queue of read request 216R, for the read operations 404 on data stored on the memory dies 206R. In some embodiments, the memory device 240 determines that each of the memory dies 206R is distinct from a subset of the active memory dies 206W that is suspended from a corresponding subset of active write operations 302, and that no sufficient power is available to implement the respective read operation 404 concurrently with the corresponding subset of active write operation 302. The memory device 240 suspends the active write operations 302 according to a suspension scheme and implements the read operations 404 on the memory die 206R in response to the read requests 216R.

In some embodiments, the plurality of active write operations 302 include write operations 302-1, 302-2, 302-3, 302-4, ..., and 302-M, where M is equal to a positive integer, and are successively suspended to create a duration of time between a suspension start time $t_{10}$ of a first write operation 302-1 and a suspension end time $t_{M1}$ of an M-th write operation 302-M. Further, in some embodiments, the plurality of write operations 302-1 to 302-M are sequentially suspended according to a predefined order. In some embodiments, the plurality of read operations 404 include read operations 404-1, 404-2, ..., and 404-N, where N is equal to a positive integer, and are successively implemented during the duration of time created by suspension of the active write operations 302. Power is conserved by way of suspension of the active write operations 302 and allocated to implement the read operations 404 that are relatively shorter than the write operations 302, thereby enhancing read throughput of the memory device 240.

In some embodiments, the memory device 240 determines that a first memory die 206R associated with a first read operation 404-1 is distinct from a memory die 206W associated with a write operation 302-1 and that no sufficient power is available to implement the first read operation 404-1 concurrently with the first write operation 302-1. The memory device 240 then suspends the write operation 302-1 and implements the first read operation 404-1. In some situations, while the first read operation 404-1 is implemented, one or more alternative write operations 404-2 or 404-3 are successively suspended, independently of whether the write operation 404-1 is suspended or not. In some embodiments, after implementing the first read operation 404-1, the memory device 240 identifies a second read request waiting next in the queue of read requests 216R for a second read operation 404-2 on data stored in a second memory die 206R, and determines that the second memory die 206R associated with the second read operation 404-2 is not among one or more active memory dies 206W associated with the write operations 404. The memory device 240 concurrently suspends a subset of write operations 302 (e.g., 302-2, 302-3, or 302-4) and implements the second read operation 404-2 on the second memory die 206R. The memory device 240 restarts the suspended set of write operations 302 on the one or more active memory dies 206W.

In some embodiments, each of the plurality of write operations 302 is suspended by initiating a respective suspension timer. In accordance with a determination that sufficient power is available for continuing the respective write operation 302 and that a suspension timer associated with the respective write operation 302 has expired, the memory device 240 obtains a write resume instruction (e.g., a last resume signal 312-M associated with the M-th write operation 302-M) to continue the respective write operation 302, and restarts the respective suspended write operation 302. Further, in some embodiments, the plurality of write operations 302 are suspended sequentially in an asynchronous manner. Alternatively, in some embodiments (FIG. 7), the plurality of write operations 302 are suspended in a synchronous manner based on one or more predefined temporal delays.

In some embodiments, the one or more active memory dies 206W accessed by the plurality of write operations 302 includes a first number ($N_1$) of memory dies, and the memory device 240 includes a total number ($N_T$) of memory dies 206. The first number is smaller than the total number. For example, the plurality of write operations 302 only access three memory dies 206W, while the memory device 240 includes an SSD having eight memory dies 206. Additionally, in some embodiments, in accordance with a determination that the first number ($N_1$) is less than a predefined portion of the total number ($N_T$) (e.g., $N_1 < 0.5 N_T$)), the memory device 240 determines that no sufficient power is available to implement the first read request 404-1 concurrently with the plurality of write operations 302.

Figure 8:
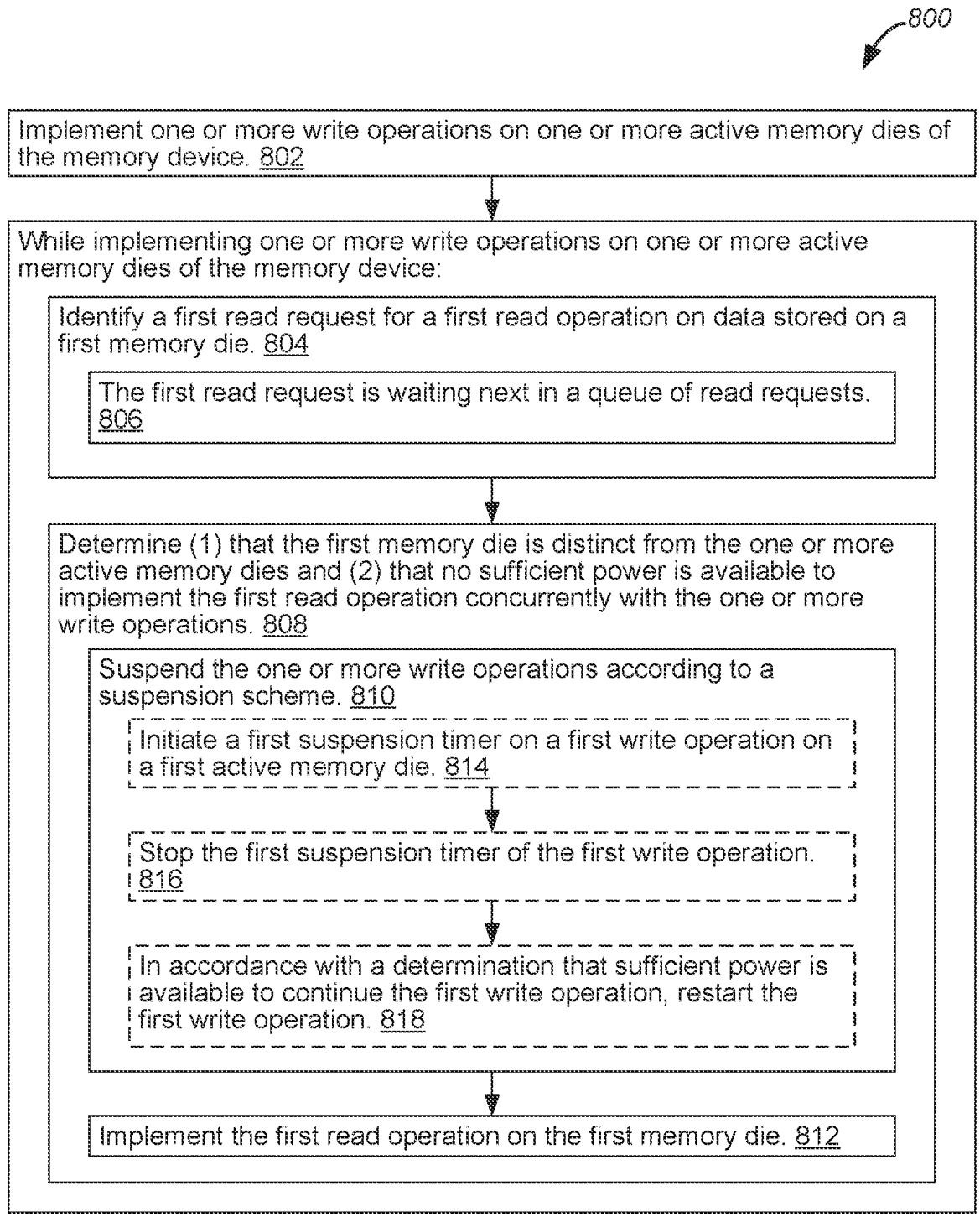
FIG. 8 is a flow diagram of another example method for managing memory operations (e.g., read and write operations) in a memory system, in accordance with some embodiments.

FIG. 8 is a flow diagram of an example method for managing memory operations (e.g., read and write operations) in a memory system, in accordance with some embodiments. The memory system includes a memory system 200 that further includes a memory device 240 having a memory controller 202 (FIG. 2). The method 800 is implemented by the memory device 240. In an example, the memory device 240 includes an SSD that further includes the memory controller 202 and is configured to implement the method 800. The memory device 240 (e.g., a controller 202 of the memory device 240 in FIG. 2) implements (operation 802) one or more write operations 302 on one or more active memory dies 206W of the memory device 240. While implementing the one or more write operations 302, the memory device 240 identifies (operation 804) a first read request 320-1 for a first read operation 404 on data stored on a first memory die 206R1. The first read request 320-1 is waiting (operation 806) next in a queue of read requests 216R. In some embodiments, the memory device 240 determines (operation 808) (1) that the first memory die 206R1 is distinct from the one or more active memory dies 206W and (2) that no sufficient power is available to implement the first read operation 404 concurrently with the one or more write operations 302. In accordance with a determination (1) that the first memory die 206R1 is distinct from the one or more active memory dies 206W and (2) that no sufficient power is available to implement the first read operation 404 concurrently with the one or more write operations 302, the memory device 240 suspends (operation 810) the one or more write operations 302 according to a suspension scheme and implements (operation 812) the first read operation 404 on the first memory die 206R1.

In some embodiments (e.g., FIG. 4), in accordance with the suspension scheme, the memory device 240 initiates (operation 814) a first suspension timer on a first write operation 302 on a first active memory die 206W, stops (operation 816) the first suspension timer of the first write operation 302. In accordance with a determination that sufficient power is available to continue the first write operation 302, the memory device 240 restarts (operation 818) the first write operation 302. Further, in some embodiments, the memory device 240 starts, implements, and completes the first read operation 404, while the first suspension timer of the first write operation 302 is running. Additionally, in some embodiments, the memory device 240 identifies a second read request 320-2 for a second read operation 406 (FIG. 4) on data stored in a second memory die 206R2 waiting next in the queue of read requests 216R. In accordance with a determination (1) that the second memory die 206R2 is distinct from the one or more active memory dies 206W and (2) that the first suspended write operation has not been resumed, the memory device 240 continues to suspend the first write operation 302 and implements the second read operation 406 on the second memory die 206R2.

Further, in some embodiments (e.g., FIG. 6), while the first suspension timer is running, the memory device 240 initiates a second suspension timer on a second write operation 602 on a second distinct active memory die 206W2, and starts the first read operation 404. While the second suspension timer is running, the memory device 240 stops the first suspension timer on the first write operation 302, restarts the first write operation 302, and continues to implement and complete the first read operation 404. Additionally, in some embodiments, the memory device 240 stops the second suspension timer of the second write operation 602 and restarts the second write operation 602.

In some embodiments (e.g., FIG. 6), while the first suspension timer is running, the memory device 240 sequentially initiates a second suspension timer on a second write operation 602 on a second distinct active memory die 206W2, completes the first read operation 404, and in accordance with a determination that sufficient power is available to continue the second write operation 602 and that the second suspension timer has expired, receives a write resume instruction (e.g., an enabling pulse on a resume signal 612) to restart the second write operation 602.

In some embodiments, after implementing the first read operation 404, the memory device 240 identifies a second read request 320-2 (FIG. 4) for a second read operation 406 on data stored in a second memory die 206R2 waiting next in the queue of read requests 216R, and determines that the second memory die 206R2 is not among the one or more active memory dies 206W. In accordance with a determination that the second memory die 206R2 is not among the one or more active memory dies 206W, concurrently, the memory device 240 suspends a subset of the one or more write operations 302, implements the second read operation 406 on the second memory die 206R2, and restarts the suspended one of the one or more write operations 302 on the one or more active memory dies 206W.

In some embodiments, the one or more active memory dies 206W include a first number ($N_1$) of memory dies, and the memory device 240 includes a total number ($N_T$) of memory dies. The first number ($N_1$) is smaller than the total number ($N_T$). Further, in some embodiments, in accordance with a determination that the first number ($N_1$) is less than a predefined portion of the total number ($N_T$), the memory device 240 determines that no sufficient power is available to implement the first read request 320-1 concurrently with the one or more write operations 302.

In some embodiments (e.g., FIG. 7), the one or more write operations 302 include a plurality of write operations 302. The memory device 240 suspends the plurality of write operations 302 sequentially according to a predefined order. Further, in some embodiments, each write operation 302 is suspended by initiating a respective suspension timer. In accordance with a determination that sufficient power is available and that a suspension timer associated with each write operation has expired, the memory device 240 obtains a write resume instruction to continue the respective write operation 302 and restarts the respective suspended write operation 302. Additionally, in some embodiments, the plurality of write operations 302 are suspended sequentially in an asynchronous manner. Alternatively, in some embodiments, the plurality of write operations 302 are suspended in a synchronous manner based on one or more predefined temporal delays.

In some embodiments (e.g., FIG. 6), in accordance with the suspension scheme, the memory device 240 suspends a first write operation 302 on a first active memory die 206W1. While the first write operation 302 is suspended, the memory device 240 initiates suspension of a second write operation 602 on a second distinct active memory die 206W2 and starts the first read operation 404. Further, in some embodiments, after the second write operation 602 is suspended, the memory device 240 stops suspension of the first write operation 302, restarts the first write operation 302, continues to implement and complete the first read operation 404, stops suspension of the second write operation 602, and restarts the second write operation 602.

In some embodiments (e.g., FIG. 4), in accordance with the suspension scheme, the memory device 240 suspends a first write operation 302 on a first active memory die 206W during an interval (e.g., between times to and $t_1$). The memory device 240 starts, implements, and completes the first read operation 404 during the interval. In accordance with a determination that sufficient power is available to continue the first write operation 302, the memory device 240 restarts the first write operation 302.

Memory is also used to store instructions and data associated with the method 800, and includes high-speed random-access memory, such as SRAM, DDR DRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 800. Alternatively, in some embodiments, the electronic system implements the method 800 at least partially based on an ASIC. The memory system 200 of the electronic system includes an SSD in a data center or a client device.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method implemented in a memory device, comprising:
    while implementing a plurality of write operations in a first queue of write requests on one or more active memory dies of the memory device:
        identifying a first read request for a first read operation on data stored on a first memory die, wherein the first read request is waiting next in a second queue of read requests distinct from the first queue of write requests; and
        in accordance with a determination (1) that the first memory die is distinct from the one or more active memory dies and (2) that no sufficient power is available to implement the first read operation concurrently with the plurality of write operations:
            suspending the plurality of write operations according to a suspension scheme, wherein the plurality of write operations are suspended in a synchronous manner based on one or more predefined temporal delays; and
            implementing the first read operation on the first memory die.

2. The method of claim 1, wherein suspending the plurality of write operations according to the suspension scheme further comprises, in accordance with the suspension scheme:
    initiating a first suspension timer on a first write operation on a first active memory die;
    stopping the first suspension timer of the first write operation; and
    in accordance with a determination that sufficient power is available to continue the first write operation, restarting the first write operation.

3. The method of claim 2, further comprising:
  starting, implementing, and completing the first read operation, while the first suspension timer of the first write operation is running.

4. The method of claim 1, wherein the plurality of write operations include a first write operation, the method further comprising:
  identifying a second read request for a second read operation on data stored in a second memory die waiting next in the second queue of read requests; and
  in accordance with a determination (1) that the second memory die is distinct from the one or more active memory dies and (2) that the first suspended write operation has not been resumed, continuing to suspend the first write operation and implementing the second read operation on the second memory die.

5. The method of claim 2, suspending the plurality of write operations according to the suspension scheme further comprises:
  while the first suspension timer is running, initiating a second suspension timer on a second write operation on a second distinct active memory die, and starting the first read operation; and
  while the second suspension timer is running, stopping the first suspension timer on the first write operation, restarting the first write operation, and continuing to implement and complete the first read operation.

6. The method of claim 5, suspending the plurality of write operations according to the suspension scheme further comprises:
  stopping the second suspension timer of the second write operation and restarting the second write operation.

7. The method of claim 2, suspending the plurality of write operations according to the suspension scheme further comprises:
  while the first suspension timer is running, initiating a second suspension timer on a second write operation on a second distinct active memory die;
  completing the first read operation; and
  in accordance with a determination that sufficient power is available to continue the second write operation and that the second suspension timer has expired, receiving a write resume instruction to restart the second write operation.

8. The method of claim 1, further comprising:
  after implementing the first read operation, identifying a second read request for a second read operation on data stored in a second memory die waiting next in the second queue of read requests;
  determining that the second memory die is not among the one or more active memory dies;
  in accordance with a determination that the second memory die is not among the one or more active memory dies, concurrently:
    suspending a subset of the plurality of write operations; and
    implementing the second read operation on the second memory die; and
  restarting the suspended one of the plurality of write operations on the one or more active memory dies.

9. The method of claim 1, wherein the one or more active memory dies include a first number of memory dies, and the memory device includes a total number of memory dies, and wherein the first number is smaller than the total number.

10. The method of claim 9, further comprising:
  in accordance with a determination that the first number is less than a predefined portion of the total number, determining that no sufficient power is available to implement the first read request concurrently with the plurality of write operations.

11. A memory device, comprising:
  one or more processors; and
  memory storing one or more programs for execution by the one or more processors, the one or more programs further comprising instructions for:
    while implementing a plurality of write operations in a first queue of write requests on one or more active memory dies of the memory device:
      identifying a first read request for a first read operation on data stored on a first memory die, wherein the first read request is waiting next in a second queue of read requests distinct from the first queue of write requests; and
      in accordance with a determination (1) that the first memory die is distinct from the one or more active memory dies and (2) that no sufficient power is available to implement the first read operation concurrently with the plurality of write operations:
        suspending the plurality of write operations according to a suspension scheme, wherein the plurality of write operations are suspended in a synchronous manner based on one or more predefined temporal delays; and
        implementing the first read operation on the first memory die.

12. The memory device of claim 11, wherein suspending the plurality of write operations according to the suspension scheme further comprises:
  suspending the plurality of write operations sequentially according to a predefined order.

13. The memory device of claim 12, wherein each write operation is suspended by initiating a respective suspension timer, the one or more programs further comprising instructions for:
  in accordance with a determination that sufficient power is available and that a suspension timer associated with each write operation has expired:
    obtaining a write resume instruction to continue the respective write operation; and
    restarting the respective suspended write operation.

14. The memory device of claim 11, wherein suspending the plurality of write operations according to the suspension scheme further comprises, in accordance with the suspension scheme:
  suspending a first write operation on a first active memory die; and
  while the first write operation is suspended, initiating suspension of a second write operation on a second distinct active memory die and starting the first read operation.

15. The memory device of claim 11, wherein suspending the plurality of write operations according to the suspension scheme further comprises, in accordance with the suspension scheme:
  suspending a first write operation on a first active memory die during an interval;
  starting, implementing, and completing the first read operation during the interval; and
  in accordance with a determination that sufficient power is available to continue the first write operation, restarting the first write operation.

16. The memory device of claim 11, wherein the one or more active memory dies include a first number of memory dies, and the memory device includes a total number of memory dies, and one or more programs further comprise instructions for, in accordance with a determination that the first number is less than a predefined portion of the total number, determining that no sufficient power is available to implement the first read request concurrently with the plurality of write operations.

17. A non-transitory computer-readable storage medium, storing one or more programs for execution by a memory device, the one or more programs further comprising instructions for:

while implementing a plurality of write operations in a first queue of write requests on one or more active memory dies of the memory device:

identifying a first read request for a first read operation on data stored on a first memory die, wherein the first read request is waiting next in a second queue of read requests distinct from the first queue of write requests; and in accordance with a determination (1) that the first memory die is distinct from the one or more active memory dies and (2) that no sufficient power is available to implement the first read operation concurrently with the plurality of write operations:

suspending the plurality of write operations according to a suspension scheme, wherein the plurality of write operations are suspended in a synchronous manner based on one or more predefined temporal delays; and implementing the first read operation on the first memory die.

18. The non-transitory computer-readable storage medium of claim 17, wherein suspending the plurality of write operations according to the suspension scheme further comprises, in accordance with the suspension scheme:

suspending a first write operation on a first active memory die; and while the first write operation is suspended, initiating suspension of a second write operation on a second distinct active memory die and starting the first read operation.

19. The non-transitory computer-readable storage medium of claim 18, suspending the plurality of write operations according to the suspension scheme further comprises:

after the second write operation is suspended, stopping suspension of the first write operation, restarting the first write operation, and continuing to implement and complete the first read operation; and stopping suspension of the second write operation and restarting the second write operation.

20. The non-transitory computer-readable storage medium of claim 17, wherein suspending the plurality of write operations according to the suspension scheme further comprises, in accordance with the suspension scheme:

suspending a first write operation on a first active memory die during an interval;

starting, implementing, and completing the first read operation during the interval; and in accordance with a determination that sufficient power is available to continue the first write operation, restarting the first write operation.

* * * * *